Oct. 10, 1961  V. R. KOON  3,003,301
POWER MOWER EDGER ATTACHMENT
Filed July 21, 1959  2 Sheets-Sheet 1

INVENTOR.
VERNE R. KOON
BY *Victor J. Evans & Co.*
ATTORNEYS

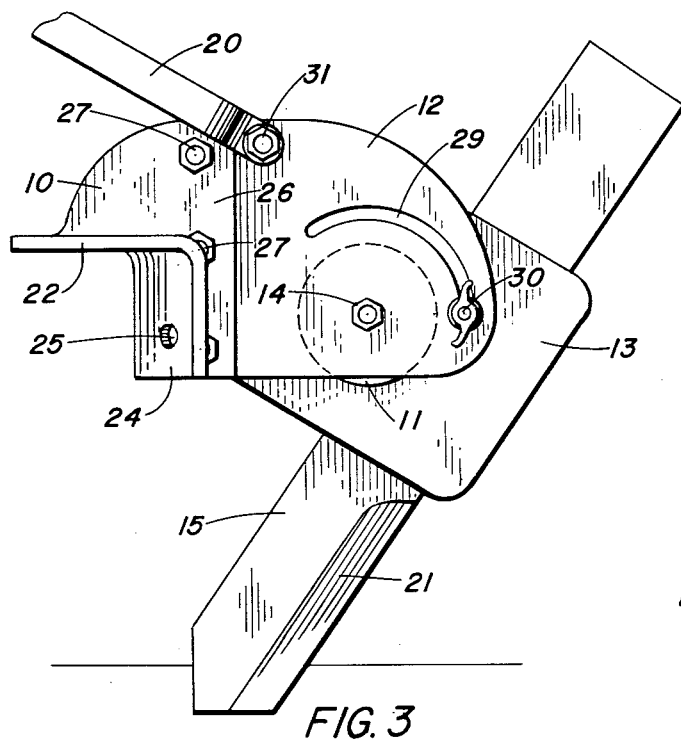
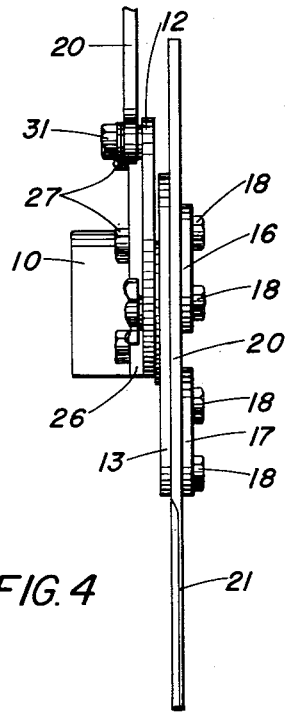
FIG. 3
FIG. 4
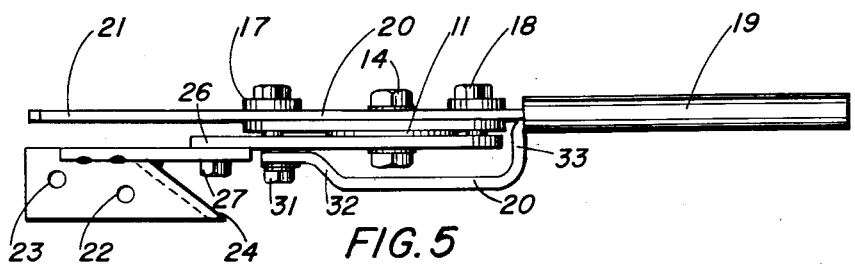
FIG. 5
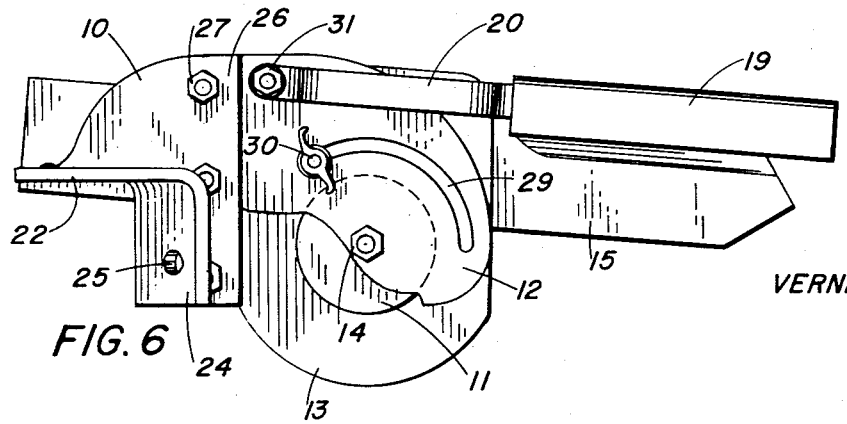
FIG. 6
INVENTOR
VERNE R. KOON United States Patent Office 3,003,301
Patented Oct. 10, 1961

3,003,301
POWER MOWER EDGER ATTACHMENT
Verne R. Koon, 205 Sterling Point Drive, Portsmouth, Va.
Filed July 21, 1959, Ser. No. 828,558
1 Claim. (Cl. 56—256)

This invention relates to edger attachments for power mowers particularly for trimming grass at the edge of a concrete walk, flower bed, or the like, and in particular mounting means for an edger blade attached by a bracket to a housing of a mower and mounted to be positioned, selectively, in an operative position for trimming the grass at the edge of a walk, or in an upper inoperative position when the edger is not in use and when the mower is in transportation, such as in traveling from one position to another.

The purpose of this invention is to provide an attachment for mounting an edger blade on a power mower to obviate the necessity of purchasing both a power mower and an edger.

Various types of edgers have been provided as separate and independent units. However, the operating end of an edger is of comparatively light weight so that considerable force is required to hold the cutting blade of the edger in the sod. With this thought in mind this invention contemplates an edger attachment designed to be permanently mounted on the housing of a power mower whereby the weight of the mower holds the edger blade in cutting relation to sod making it necessary for an operator to push or pull the mower as the edger blade cuts the grass or sod at the edge of a walk, driveway, flower bed, or the like.

The object of this invention, is, therefore, to provide an edger attachment for a power mower whereby grass extending over the edge of a walk, driveway, or the like is cut by the mower.

Another object of the invention is to provide an edger attachment for a power mower whereby the weight of the mower holds the edger blade in an operative position.

Another important object of the invention is to provide an edger attachment for a power mower in which the attachment may be mounted on a mower housing by the average layman.

A further object of the invention is to provide an edger attachment for a power mower wherein the attachment is of a simple and economical construction.

With these and other objects and advantages in view the invention embodies a mounting bracket, which may be provided in different designs to correspond with mowers of different manufacturers, a side plate attached to and extended from the bracket, said side plate having an arcuate slot therein, a swivel plate pivotally mounted on the side plate, a cutting blade clamped by bolts and links to the swivel plate, and a shield or guard pivotally mounted on the side plate and positioned to extend over the sharp edge of the blade with the blade in an inoperative position.

Other features and advantages of the invention will appear from the following description taken in connection with the drawings, wherein:

FIGURE 3 is a side elevational view of the attachment showing a bracket for mounting the attachment on the housing of a power mower.

FIGURE 4 is an edge elevational view of the attachment with the parts as shown in FIGURE 3.

FIGURE 5 is a plan view of the attachment also with the parts as shown in FIGURE 3.

FIGURE 6 is a side elevational view of the attachment with part of a side plate thereof broken away and with the cutting blade in an inoperative position in which the sharp edge is covered by the shield.

Figure 1:
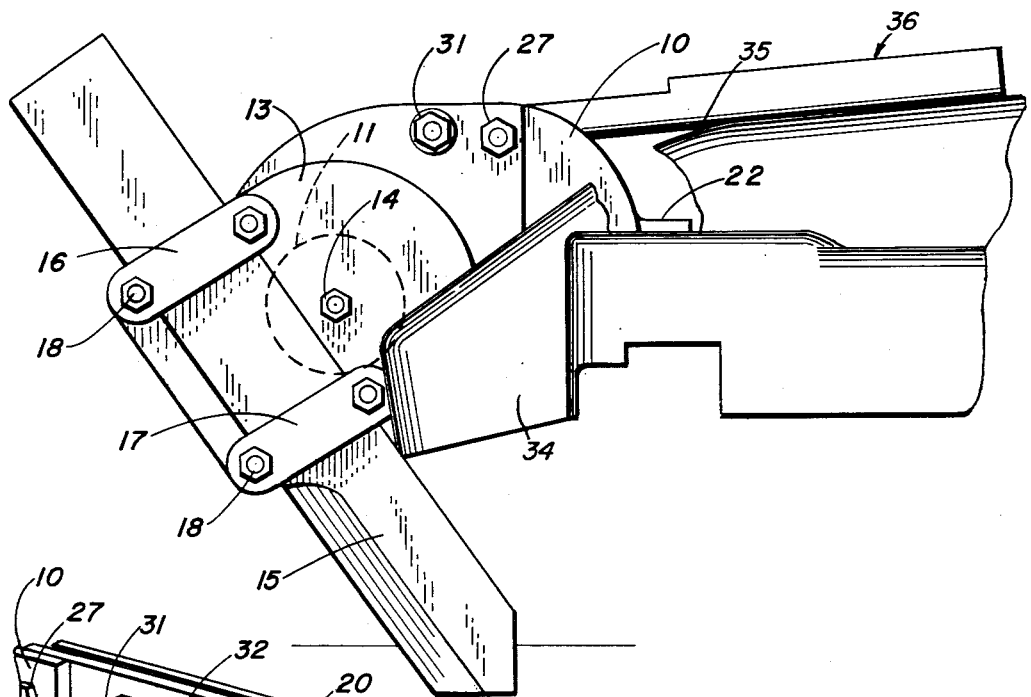
FIGURE 1 is a side elevational view of the attachment looking toward the inside of the attachment and showing the links and bolts for securing the edger blade to the swivel plate.

Referring now to the drawings wherein like reference characters denote corresponding parts the improved edger attachment of this invention includes a bracket 10, a spacing washer 11, a side plate 12 extended from the bracket, a swivel plate 13 having an arcuate lower edge 28 pivotally mounted by a bolt 14 on the bracket and side plate, a cutting blade 15 clamped to the swivel plate 13 by links 16 and 17 and bolts 18, and a shield 19 carried by a bar 20 and designed to be positioned over a cutting edge 21 of the blade 15 with the blade in an inoperative position.

The bracket 10 is formed with a horizontally disposed flange 22 that is provided with bolt holes 23 through which bolts, not shown, extend for securing the flange on the upper surface of the housing of a power mower. Depending from the flange 22 is an angularly disposed flange 24 having a bolt hole 25 therein, and the flange 24 is positioned to rest against a vertical side surface 34 of the housing 35 of a mower 36 with the flange 22 resting upon the upper surface of the housing. A bolt, not shown, may be placed through the opening 25 to secure the bracket against the wall of the housing.

The bracket 10 is also provided with a flange 26 to which the side plate 12 is secured by bolts 27. The lower edge 13' of the swivel plate 13 is provided with an arcuate surface 28 and the side plate 12 is provided with an arcuate slot 29 through which a thumb screw 30 threaded in the swivel plate 13 extends and by loosening the thumb screw the cutting blade 15 may readily be turned from the position shown in FIGURES 1 and 3 to the position shown in FIGURES 2 and 6 in which position the blade remains as the power mower is used in the conventional manner.

The arm 20 upon which the shield 19 is carried is pivotally mounted by a bolt 31 on the side plate 12 and the arm 20 is provided with offset sections 32 and 33 so that the arm is free to pass over bolt heads and the like of the mounting element.

Figure 2:
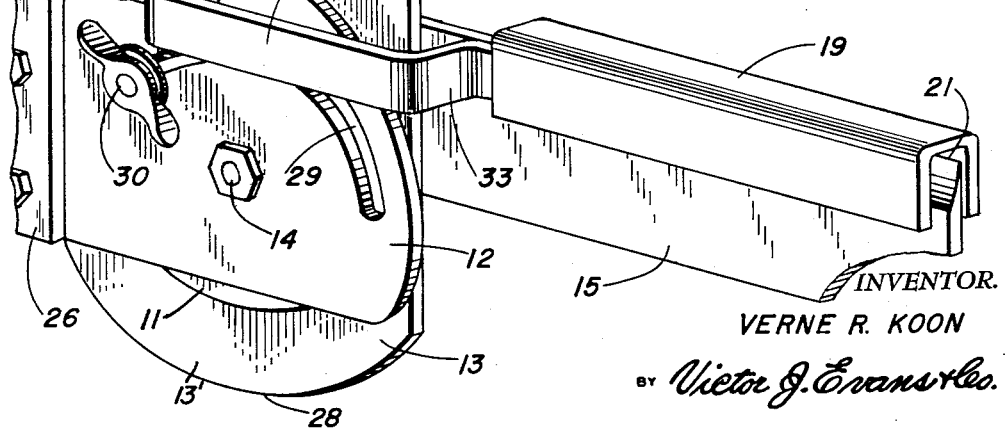
FIGURE 2 is a prospective view, with parts broken away and with the parts shown on an enlarged scale, showing the cutting blade of the edger attachment in an inoperative position and in which the sharp edge of the blade is covered by a shield.

With the parts assembled as illustrated and described the edger blade 15 is turned to the position illustrated in FIGURES 1 and 3 for trimming grass at the sides of a walk, driveway, or the like and when it is desired to use the power mower in the conventional manner the blade is turned to the position shown in FIGURES 2 and 6. The attachment may, therefore, be permanently mounted on a power mower and the mower used in the conventional manner or for trimming grass at edges of a walk or the like, as may be desired.

It will be understood that modifications, within the scope of the appending claim, may be made in the design and arrangement of the parts without departing from the spirit of the invention.

What is claimed is:

In an edger attachment, the combination which comprises a bracket having an L-shaped section with bolt holes therein, said bracket also having a vertically disposed flange on the edge opposite to that on which the L-shaped section is positioned, a side plate bolted to the flange of the bracket and extended therefrom, a swivel plate parallel to and positioned in spaced relation to the side plate, a bolt extended through the side plate and swivel plate for pivotally mounting the swivel plate on the side plate, a spacing washer on the bolt pivotally mounting the swivel plate on the side plate and positioned between the swivel and side plates, said side plate having an arcuate slot therein, said slot being described on a radius extended from the axis of the bolt pivotally mounting the swivel plate on the side plate, a thumb screw threaded in the swivel plate and extended through the said slot for clamping the swivel plate in radially adjusted positions on the side plate, a blade having a sharp cutting edge, links having bolts extended through ends thereof and threaded through the swivel plate for clamping said blade to said swivel plate, an arm pivotally mounted on the side plate and a shield carried by said arm and positioned to extend over the cutting edge of the blade in an upwardly disposed inoperative position.

References Cited in the file of this patent

UNITED STATES PATENTS

| | | |
|---|---|---|
| 2,209,946 | Black | Aug. 6, 1940 |
| 2,676,447 | Asbury | Apr. 27, 1954 |
| 2,719,398 | Hutchens | Oct. 4, 1955 |
| 2,752,841 | La Plante | July 3, 1956 |
| 2,782,583 | Oberle | Feb. 26, 1957 |
| 2,880,563 | Nottmeyer | Apr. 7, 1959 |